United States Patent
Miura et al.

(10) Patent No.: US 6,729,161 B1
(45) Date of Patent: May 4, 2004

(54) METHOD OF SELECTIVELY REFORMING AN INNER PART OF AN INORGANIC BODY

(75) Inventors: Kiyotaka Miura, Nara (JP); Jianrong Qiu, Kyoto (JP); Yuki Kondo, Nara (JP); Kazuyuki Hirao, Kyoto-fu (JP)

(73) Assignees: Japan Science and Technology, Corporation, Saitama-Ken (JP); Nihon Yamamura Glass Co., Ltd., Hyogo-Ken (JP); Central Glass Co., Ltd., Yamaguchi-Ken (JP)

( * ) Notice: Subject to any disclaimer, the term of this patent is extended or adjusted under 35 U.S.C. 154(b) by 0 days.

(21) Appl. No.: 09/600,195
(22) PCT Filed: Dec. 16, 1998
(86) PCT No.: PCT/JP98/05676
§ 371 (c)(1),
(2), (4) Date: Jul. 12, 2000
(87) PCT Pub. No.: WO99/36171
PCT Pub. Date: Jul. 22, 1999

(30) Foreign Application Priority Data

Jan. 13, 1998 (JP) ............................................. 10-004416

(51) Int. Cl.⁷ ................................................. B01J 19/12
(52) U.S. Cl. .............................. 65/390; 65/392; 65/441; 359/326
(58) Field of Search .......................... 65/390, 392, 441; 359/326–332

(56) References Cited

U.S. PATENT DOCUMENTS

| | | | | |
|---|---|---|---|---|
| 5,684,621 A | * | 11/1997 | Downing | 359/326 |
| 5,764,403 A | * | 6/1998 | Downing | 359/326 |
| 5,866,200 A | * | 2/1999 | Yoshino et al. | 427/163.2 |
| 5,978,538 A | * | 11/1999 | Miura et al. | 385/123 |
| 6,327,074 B1 | * | 12/2001 | Bass et al. | 359/326 |

FOREIGN PATENT DOCUMENTS

| | | |
|---|---|---|
| JP | 60191024 | 9/1985 |
| JP | 06089999 | 3/1994 |
| JP | 08288582 | 11/1996 |
| JP | 08301695 | 11/1996 |

OTHER PUBLICATIONS

USPTO Classification Definitions for Class 75 (Apr. 3, 1990) p. 75–8 Transition Metals.*
JPAB—Pub–No JP411231151A, Aug. 1999.*
Qiu, Jianrong et al., "Photostimulated luminescence in $Eu^{2+}$ doped fluoroaluminate glasses", *Appl. Phys. Lett. 71* (6), pp. 759–761 (1997).

* cited by examiner

*Primary Examiner*—Sean Vincent
(74) *Attorney, Agent, or Firm*—Webb Ziesenheim Logsdon Orkin & Hanson, P.C.

(57) ABSTRACT

An inorganic body containing rare earth and/or transition metal ions that has been irradiated with a pulsed laser beam in the manner such that a focal point of the pulsed laser beam is adjusted to an inner part of the inorganic body is disclosed. The inorganic body may be a glass or crystal containing one or more of oxide, halide and chalcogenide. The rare earth ion may be one or more of Ce, Nd, Pr, Sm, Eu, Tb, Dy, Tm, Tb. The transition metal ion may be one or more of Ti, Mn, Cr, V, Fe, Cu, Mo and Ru. When the focal point is relatively shifted with respect to the inorganic body, an ionic valence-changed domain is formed with a predetermined pattern at the inner part of the inorganic body. The pulsed laser beam preferably has a pulse width under a picosecond. The ionic valence change occurs at the focal point and its vicinity, but the rare earth or transition metal ion keeps its original valence at all other parts, so as to form a reformed domain with a predetermined pattern in the inorganic body. Since optical properties are selectively changed at the reformed domain, the processed inorganic body is useful as a functional device such as a memory device or a light-emitting device using the differentiated optical properties.

4 Claims, 2 Drawing Sheets a : fluorescent spectrum of $Eu^{3+}$ in a zone irradiated with a pulsed laser
b : fluorescent spectrum of $Eu^{2+}$ in a non — irradiated zone

METHOD OF SELECTIVELY REFORMING AN INNER PART OF AN INORGANIC BODY

BACKGROUND OF THE INVENTION

The present invention relates to a method of selectively reforming an inner part of an inorganic body by irradiation with a condensed pulsed laser beam and a new inorganic body produced thereby.

BACKGROUND ART

When an inorganic body containing rare earth or transition metal ion is subjected to oxidization-reduction or irradiated with an X-ray or ultraviolet beam, a valence of the rare earth or transition metal ion changes. For instance, J. Qiu et al. reported change of $Eu^{2+}$ to $Eu^{3+}$ by irradiating $Eu^{2+}$-containing fluoride with an X-ray or ultraviolet beam, in Appl. Phys. Lett. 71 (1997) 759. W. A. Weyl reported change of $Mn^{2+}$ to $Mn^{3+}$ by irradiating $Mn^{2+}$-containing oxide with an ultraviolet beam, in Coloured Glasses, Society of Glass Technology (1951).

In order to realize valence change of rare earth or transition metal ion at a specified part of an inorganic body, the inorganic body is covered with a shading mask having a predetermined pattern, and then selectively irradiated with an Xray or ultraviolet beam. The valence of the ion is partially changed at a part defined by the pattern of the shading mask.

Valence of rare earth or transition metal ion can be also changed by an oxidization-reduction method in a controlled atmosphere. In this case, valence change occurs over a whole of the inorganic body, but it is difficult to selectively change a part of the ion in the inorganic body. On the other hand, valence change of ion induced by irradiation with a X-ray or ultraviolet beam depends on a reaction in one photon process, so that an energy of the X-ray or ultraviolet beam is absorbed in a surface layer of the inorganic body. As a result, it is difficult to selectively change valence of the ion only at an inner part of the inorganic body.

Conventional methods have difficulty for selectively changing ion valence at a specified inner part of an inorganic body, as above-mentioned.

SUMMARY OF THE INVENTION

The present invention is accomplished to overcome such the problems as above-mentioned. The present invention aims at provision of a new inorganic body improved in functionality by selective valence change of rare earth or transition metal ion at its specified inner part. The selective valence change is realized by irradiating an inorganic body containing rare earth and/or transition metal ion with a condensed pulsed laser beam of wavelength different from absorption wavelength of the rare earth and/or transition metal ion.

According to the present invention, a pulsed laser beam of wavelength different from the absorption wavelength of rare earth and/or transition metal ion emitted to an inorganic body containing rare earth and/or transition metal ion in a manner such that a focal point of the pulsed laser beam is adjusted to an inner part of the inorganic body. Such condensing irradiation induces valence change of the rare earth and/or transition metal ion only at the focal point and its vicinity.

The inorganic body may be a glass or crystal containing one or more of oxides, halides and chalcogenides. Rare earth ion may be one or more of Ce, Nd, Pr, Sm, Eu, Tb, Dy, Tm and Tb ions. Transition metal ion may be one or more of Ti Mn, Cr, V, Fe, Cu, Mo and Ru ions.

When the focal point is relatively shifted with respect to the inorganic body, a domain with a predetermined pattern where the rare earth and/or transition metal ion changes its valence is formed at an inner part of the inorganic body. The pulsed laser beam is with pulse width under a picosecond.

DETAILED DESCRIPTION OF THE PREFERRED EMBODIMENTS

A pulsed laser beam useful in the present invention is of wavelength which does not overlap the characteristic absorption wavelength of an objective inorganic body including the absorption wavelength of rare earth or transition metal ion. As far as a pulse energy of 50% or more on the basis of a total irradiation energy is obtained, ionic valence change occurs only at a focal point.

A pulsed laser beam is with pulse width under a picosecond. Since a peak power of the pulsed laser beam becomes smaller as elongation of the pulse duration, a peak energy of the pulsed laser beam shall be greater in order to obtain a similar peak power density. The peak power of the pulsed laser beam is represented by a power (W) which is a divided value of an energy (J) per 1 pulse by pulse width (sec), and the peak power density is represented by a ratio ($W/cm^2$) of the peak power (W) to a unit area ($cm^2$).

Pulse width is preferably controlled within a range of 100–500 femtoseconds. If an inorganic body is irradiated with a laser beam with pulse width narrower than 100 femtoseconds, pulse width in an inner part of the inorganic body is greatly varied in response to a position of a focal point along a direction of depth, since the inorganic body itself is a dispersion material. Consequently, it is difficult to dimensionally control a domain where ionic valence change occurs. If the pulse width is over 500 femtoseconds on the contrary, the inorganic body is likely damaged when its inner part is irradiated with a condensed pulsed laser beam with a peak energy sufficient for ionic valence change.

Figure 1:
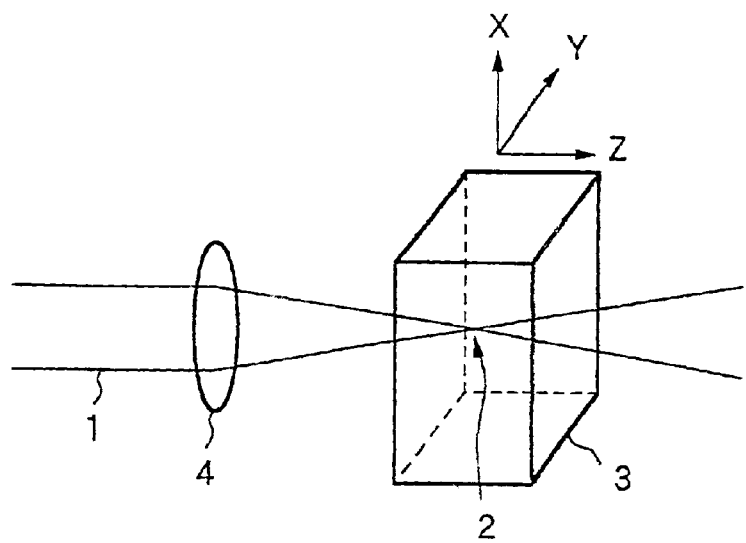
FIG. 1 is a schematic view for illustrating an inorganic body irradiated with a pulsed laser beam which is condensed at a focal point adjusted to an interior of the inorganic body.

A pulsed laser beam 1 is condensed by a condenser lens 4 so as to position a focal point 2 at an inner part of an inorganic body 3, and emitted to the inorganic body 3, as shown in FIG. 1. When an electric field intensity of the pulsed laser beam 1 at the focal point 2 exceeds a certain threshold in response to valence change of rare earth or transition metal ion, the rare earth or transition metal ion changes its valency at the focal point 2 and its vicinity. A position apart from the focal point 2 is subjected to an electric field of intensity insufficient for occurrence of ionic valence change. As a result, the valence change of the rare earth or transition metal ion occurs only at the focal point 2 and its vicinity, and the inner part of the inorganic body 3 is selectively reformed.

A domain where such ionic valence change occurs can be shaped to a predetermined pattern by relative movement of the focal point 2 with respect to the inorganic body 3. For instance, the ionic valence-changed domain is shaped to a two- or three-dimensional pattern by shifting the focal point 2 along directions of X, Y, Z by operation of an optical system, shifting the inorganic body 3 along directions of Y and Z, or shifting both the focal point 2 and the inorganic body 3.

The inner part (reformed part) of the inorganic body 3 at the focal point 2 and its vicinity is the ionic valence-changed domain, while rare earth or transition metal ion at the remaining part (unreformed part) is still of its original valence. The resulting differentiated ionic valence between the reformed and unreformed parts causes differences in optical characteristics such as light absorption and light emission. The inorganic body reformed in this way is useful as a function device such as an optical memory device, light-emitting device or amplifier device, using such differentiated ionic valence.

The present invention will be more apparent from the following examples. Of course, these examples do not put any restrictions on the scope of the present invention.

EXAMPLE 1

$SiO_2$, $Na_2CO_3$, $Eu_2O_3$ raw materials were weighed oxide glass composition which contained cations at ratios of 73 mol % $Si^{4+}$, 25 mol % $Na^+$ and 2 mol % $Eu^{2+}$. The mixture was put in a Pt crucible and melted 30 minutes at 1450° C. and then cooled to a room temperature. A glass obtained in this way was received in a carbon crucible and subjected to a reducing reaction at 1450° C. in an atmosphere of 5 vol. % $H_2N_2$ for 60 minutes. Thereafter, the glass melt was rapidly cooled together with the crucible to room temperature to obtain a $Eu^{2+}$-containing oxide glass.

A testpiece of 5 mm in thickness was cut off the $Eu^{2+}$-containing oxide glass. Two planes of the testpiece were polished at an optical level and examined by spectral analysis for measuring absorption spectrum. The presence of $Eu^{2+}$ in the oxide glass was. detected by spectral analysis.

The testpiece was then irradiated with a pulsed laser beam 1 which was condensed by a condenser lens 4 in a manner such that a focal point 2 is positioned at an inner part of the testpiece 3, as shown in FIG. 1. The pulsed laser beam was of 800 nm wavelength with 300 femtoseconds pulse width and 91 kHz a repetition rate oscillated from a Ti— sapphire laser excited with an argon laser.

Figure 2:
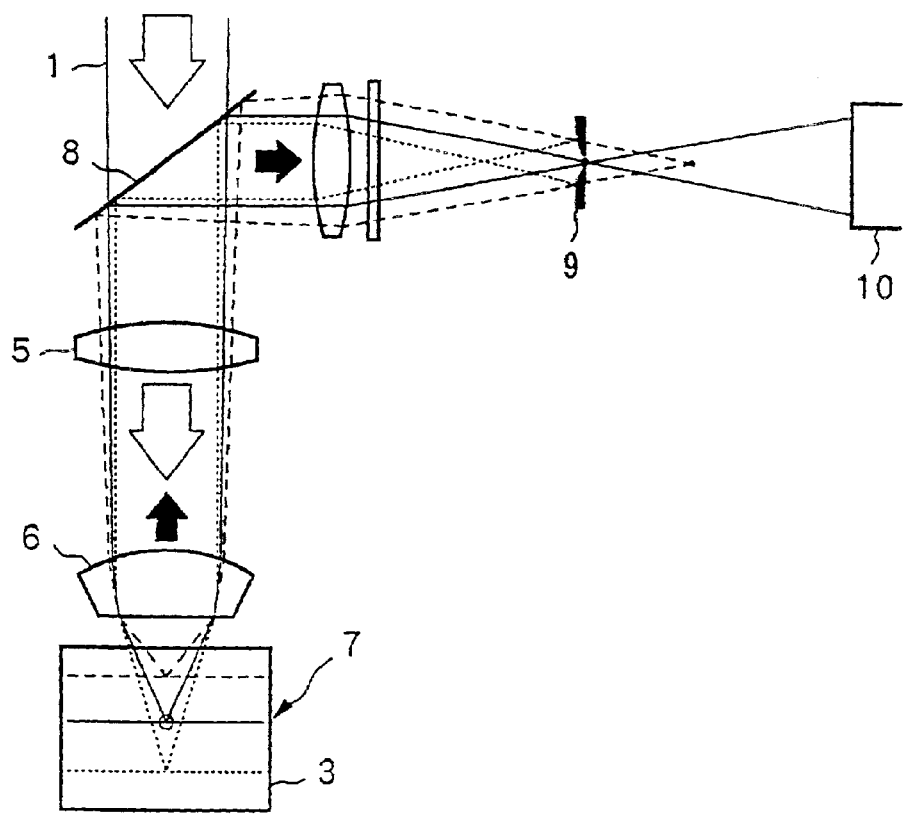
FIG. 2 is a schematic view for illustrating a confocus optical system useful for measuring an ionic valence-changed domain.

A light beam of 400 nm wavelength was emitted to and condensed at the same focal point 3 of the testpiece after being irradiated with the condensed pulsed laser beam, using a confocus optical system (shown in FIG. 2). In this confocus optical system, a laser beam 1 which held diffraction minimum penetrates a tube lens 5 and an objective lens 6, and condensed in a surface or inner part of the testpiece 3. When a condensing plane 7 is adjusted to the inner part of the testpiece 3, a light through the condensing plane 7 penetrates the objective lens 6 and tube lens 5, and is imaged on a confocus pin-hole 9 by a beam splitters 8. Since light beams emitted from the other parts except the condensing plane 7 of the testpiece 3 are effectively separated by the confocus pin-hole 9, characteristic changes, i.e., ionic valence change, at the focal point 3 are proven from a fluorescence spectrum obtained by detecting the image formation with a photodetector 10.

Figure 3:
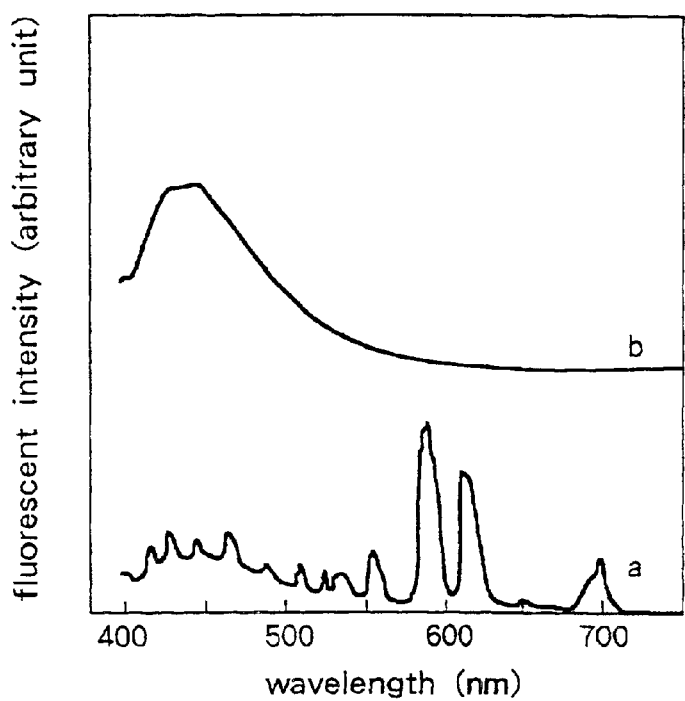
FIG. 3 is a graph which indicates valence change of rare earth or transition metal ion by condensing irradiation with a pulsed laser beam.

FIG. 3 is a measuring result of a fluorescence spectrum (a) from a part corresponding to the focal point 2 (shown in FIG. 1). The presence of a fluorescence spectrum originated in $Eu^{3+}$ is noted in FIG. 3. For comparison, a fluorescence spectrum from the other part except the focal point 2 was measured in the same way. In this case, a fluorescence spectrum (b) originated in $Eu^{2+}$ was detected. It is apparently recognized by comparing these fluorescence spectra (a) and (b) that the valence of Eu ion was changed from 2+ to 3+ at the focal point 2 and its vicinity by emitting the pulsed laser beam 1 to and condensing it at the inner part of the testpiece 3. The same valence change of Eu ion from 2+ to 3+ was detected by emitting a pulsed laser beam and condensing it at an inner part of another glass containing halide, sulfide or chalcogenide in the same way.

EXAMPLE 2

$AlF_2$, $MgF_2$, $CaF_2$, $SrF_2$, $BaF_2$, $YF_3$, and $SmF_3$ raw materials were weighed and mixed together to prepare fluoride glass composition which contained cations at ratios of 35 mol % $Al^{3+}$, 10 mol % $Mg^{2+}$, 20 mol % $Ca^{2+}$, 10 mol % $Sr^{2+}$, 10 mol % $Ba^{2+}$, 14 mol % $Y^{3+}$, and 1 mol % $Sm^{2+}$ and an anion sole of $F^-$. The mixture was put in a carbon crucible and reductively melted 60 minutes at 1000° C. in an atmosphere of 5 vol % $H_2$—$N_2$. Thereafter, the glass melt was rapidly cooled together with the crucible to room temperature.

A testpiece was cut off an obtained $Sm^{2+}$-containing fluoride glass. Two planes of the testpiece were polished at an optical level and examined by spectral analysis for measuring absorption spectrum. The presence of $Sm^{2+}$ in the oxide glass was detected by spectral analysis.

An inner part of the testpiece 3 was subjected to condensed irradiation with a peak energy density of $10^8$–$10^{15}$ W/$cm^2$ using a pulsed laser beam 1 of 1100 nm wavelength with 120 femtoseconds pulse width and a 200 kHz repetition rate. In Example 2, the testpiece 3 was shifted at a speed of 20 $\mu$m/second with respect to an optic axis of the laser beam 1.

A fluorescent spectrum at each of a part irradiated with the pulsed laser beam and a nonirradiated part was measured by excitation with a light beam of 515 nm wavelength using the same confocus optical system as that in Example 1. The measurement result proved that Sm ion changed its valence from 2+ to 3+ only at a locus of the focal point 3 of the pulsed laser beam. A similar ionic valence change was recognized when a fluoride glass containing one or more of Ce, Nd, Pr, Eu, Tb, Dy, Tm, Yb, Ti, Mn, Cr, V, Fe, Cu, Mo and Ru ions was used.

EXAMPLE 3

A testpiece 3 of 10 mm in length, 10 mm in width and 5 mm in thickness was prepared from a single crystal having compositions of $AlF_3$:$SrF_3$:$LiF$=1:1:1 (a mol ratio) and containing 1 mol % $Ce^{3+}$ and polished at an optical level. A pulsed laser beam of 550 nm wavelength with 120 femtoseconds pulse width and a 200 kHz repetition rate was emitted to the testpiece 3 in a manner such that the pulsed laser beam 1 was condensed at a focal point 2 adjusted to an inner part of the testpiece 3 with a peak energy density of $10^8$–$10^{15}$ W/$cm^2$. In Example 3, the testpiece 3 was shifted under such irradiating condition at a speed of 20 $\mu$m/second with respect to an optical axis of the laser beam 1.

A fluorescent spectrum at each of a part irradiated with the pulsed laser beam and a non-irradiated part was measured by excitation with a light beam of 300 nm wavelength using the same confocus optical system as that in Example 1. The measurement result proved that Ce ion changed its valence from 3+ to 4+ along a locus of the focal point 2, while Ce ion kept its original valence 3+ at the other part except the locus of the focal point 3. The similar valence change of Ce ion from 3+ to 4+ was detected when other crystals containing halide, oxide and/or chalcogenide were irradiated with condensed pulsed laser beams in the same way.

INDUSTRIAL APPLICATION

According to the present invention as above-mentioned, ionic valence is changed at a focal point and its vicinity in an inner part of an inorganic body containing rare earth or transition metal ion by irradiating the inorganic body with a pulsed laser beam in a manner such that the foam point of the pulsed laser beam is adjusted to the inner part of the inorganic body. The ionic valence change occurs only at the focal point and its vicinity, while the other part keeps its original ionic valence. As a result, the inorganic body is reformed to such a state that an ionic valence-changed domain is surrounded with the remaining part which keeps the original ion valence. The partial change of the ion valence differentiates optical properties such as absorption and fluorescence, resulting in selective change of the optical properties at a specified domain in the inner part of the inorganic body. The inorganic body processed in this way is useful as a functional device such as a memory device or a light-emitting device using the differentiated optical properties.

What is claimed is:

1. A method of selectively reforming an inner part of an inorganic body comprising one of an optical memory, a light absorbing device, light emitting device and an amplifier device, which comprises:

emitting a pulsed laser beam of wavelength different from the absorption wavelength of a samarium rare earth metal ion to an inorganic body containing said samarium rare earth metal ion, and condensing said pulsed laser beam at a focal point in an inner part of said inorganic body, whereby said samarium rare earth metal ion changes its valence only at said focal point and its vicinity.

2. The method of selectively reforming an inner part of an inorganic body defined in claim 1, wherein the inorganic body is a glass or crystal containing one or more selected from the group consisting of metal oxides, metal halides and metal chalcogenides.

3. The method of selectively reforming an inner part of an inorganic body defined in claim 1, wherein the focal point is relatively shifted with respect to the inorganic body so as to form a domain with a predetermined pattern, wherein the samarium rare earth metal ion changes its valence.

4. The method of selectively reforming an inner part of an inorganic body defined in claim 1, wherein the inorganic body is irradiated with pulsed laser beam with pulse width under a picosecond.

* * * * *